(12) United States Patent
Gatzke et al.

(10) Patent No.: US 7,688,954 B2
(45) Date of Patent: Mar. 30, 2010

(54) SYSTEM AND METHOD FOR IDENTIFYING CALLER

(75) Inventors: Alan D. Gatzke, Bainbridge Island, WA (US); Benjamin H. Verdier, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 1356 days.

(21) Appl. No.: 11/128,932

(22) Filed: May 12, 2005

(65) Prior Publication Data

US 2006/0256942 A1 Nov. 16, 2006

(51) Int. Cl.
*H04M 1/64* (2006.01)
*H04M 1/56* (2006.01)
*H04M 15/06* (2006.01)

(52) U.S. Cl. .............. 379/88.21; 379/88.16; 379/88.19; 379/142.06

(58) Field of Classification Search .............. 379/88.18, 379/88.19, 88.2, 88.21, 142.01, 142.06, 142.15, 379/373.01, 373.03, 373.04, 371.02, 88.23, 379/210.02, 88.11, 88.13, 88.16, 88.27
See application file for complete search history.

(56) References Cited

U.S. PATENT DOCUMENTS

| | | | | |
|---|---|---|---|---|
| 4,720,848 | A | 1/1988 | Akiyama | 379/88 |
| 5,894,594 | A | 4/1999 | Kang | 455/412 |
| 6,351,679 | B1 | 2/2002 | Ainslie | 700/94 |
| 6,466,653 | B1 | 10/2002 | Hamrick et al. | 379/67.1 |
| 6,519,326 | B1 | 2/2003 | Milewski et al. | 379/67.1 |
| 6,553,222 | B1 | 4/2003 | Weiss | 455/415 |
| 6,671,352 | B1 | 12/2003 | Lee | 379/67.1 |
| 7,450,701 | B2 * | 11/2008 | Crockett et al. | 379/93.23 |
| 2003/0099336 | A1 * | 5/2003 | Speeney et al. | 379/88.19 |
| 2004/0032946 | A1 * | 2/2004 | Koser et al. | 379/373.01 |
| 2005/0053216 | A1 * | 3/2005 | Spencer et al. | 379/211.01 |
| 2005/0233735 | A1 * | 10/2005 | Karaoguz et al. | 455/415 |
| 2005/0243996 | A1 * | 11/2005 | Fitchmun | 379/418 |
| 2006/0133593 | A1 * | 6/2006 | Moss et al. | 379/210.02 |
| 2006/0210031 | A1 * | 9/2006 | Picard et al. | 379/88.18 |
| 2007/0293205 | A1 * | 12/2007 | Henderson | 455/415 |
| 2008/0013710 | A1 * | 1/2008 | Moss et al. | 379/207.13 |
| 2008/0031432 | A1 * | 2/2008 | Latter et al. | 379/88.23 |
| 2008/0056465 | A1 * | 3/2008 | Ruckart | 379/88.19 |
| 2008/0187120 | A1 * | 8/2008 | Walsh et al. | 379/142.05 |
| 2009/0117886 | A1 * | 5/2009 | Urban et al. | 455/415 |

OTHER PUBLICATIONS

"PhoneValet Message Center . . . More than an Answering Machine" Announcement, *Parliant Corporation*, http://www.parliant.com/phonevalet/announce.html at the Internet, Date Unknown, 3 pages.
"PhoneValet Message Center Specification," *Parliant Corporation*, http://www.parliant.com/phonevalet/specs.html at the Internet, Date Unknown, 2 pages.

* cited by examiner

*Primary Examiner*—Binh K Tieu
(74) *Attorney, Agent, or Firm*—Baker Botts L.L.P.

(57) ABSTRACT

A method of providing telecommunication service includes receiving caller identification information associated with a call to a communication device and determining whether the caller identification information corresponds to any of a plurality of stored identifiers, each stored identifier associated with audio data. The method further includes transmitting, in response to determining that the caller identification information corresponds to a stored identifier, audio data associated with the corresponding stored identifier to the communication device.

19 Claims, 4 Drawing Sheets

SYSTEM AND METHOD FOR IDENTIFYING CALLER

TECHNICAL FIELD OF THE INVENTION

This invention relates in general to telecommunication systems, and more particularly to the identification of callers.

BACKGROUND OF THE INVENTION

Rapid technological advances in the field of telecommunications have made communication components and systems dramatically less expensive and their use increasingly widespread. Despite the convenience of greater access to communication services, the ever-increasing availability of communication services may, under certain circumstances, have a disruptive effect on the present day home and workplace. As telephonic and other forms of electronic communication have become increasingly easy to initiate, many individuals have found it disruptive to be drawn into telephone conversations or other forms of communication whenever another party attempts to contact them.

SUMMARY OF THE INVENTION

In accordance with the present invention, the disadvantages and problems associated with telecommunications have been substantially reduced or eliminated. In particular, a system and method for identifying callers is provided.

In accordance with one embodiment of the present invention, a method of providing telecommunication service includes receiving caller identification information associated with a call to a communication device and determining whether the caller identification information corresponds to any of a plurality of stored identifiers, each stored identifier associated with audio data. The method further includes transmitting, in response to determining that the caller identification information corresponds to a stored identifier, audio data associated with the corresponding stored identifier to the communication device.

In accordance with another embodiment of the present invention, a system for providing communication service includes a plurality of communication devices and a server. The plurality of communication devices are capable of providing communication services to a plurality of users. The server is capable of receiving caller identification information associated with a call from a first communication device to a second communication device and determining whether the caller identification information corresponds to any of a plurality of stored identifiers, each stored identifier associated with audio data. The processor is further capable of transmitting audio data associated with the corresponding stored identifier to the second communication device in response to determining that the caller identification information corresponds to a stored identifier.

Technical advantages of certain embodiments of the present invention include a useful technique for indicating to device users that an incoming call has been received. Other technical advantages of certain embodiments of the present invention include the ability to use existing device hardware or software to play the call indicator and the ability to generate the call indicator based on a variety of different types of caller identifying information. Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
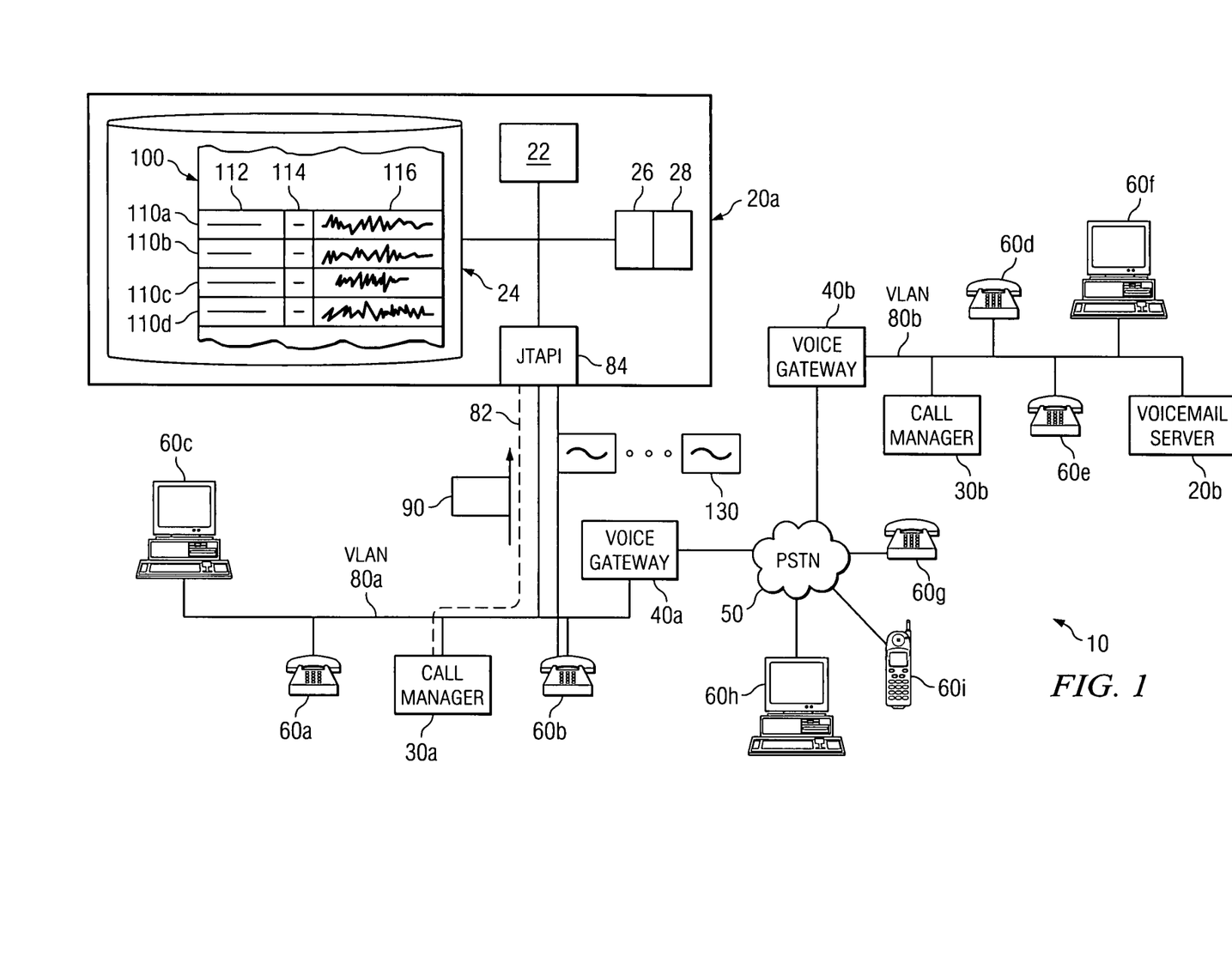
FIG. 1 illustrates a communication system according to a particular embodiment of the present invention.

FIG. 1 illustrates a communication system 10 according to a particular embodiment of the present invention. As shown, communication system 10 includes a plurality of local area networks (LANs) 80 coupled by a Public Switched Telephone Network (PSTN) 50. Each LAN 80 additionally couples a plurality of communication devices 60, a voicemail server 20, a call manager 30, and a gateway 40 to one another and to PSTN 50. During operation, voicemail servers 20 may provide an audio greeting recorded by a user to communication devices 60 that the user calls. Communication devices 60 may then play the greeting as a call indicator instead of or in addition to a standard ring. As a result, communication system 10 may provide an effective way for call recipients to determine whether to answer a particular call and/or whether to take other appropriate steps.

Communication devices 60 may each represent any suitable combination of hardware and/or software to provide communication services to users. For example, communication devices 60 may represent telephones, computers running telephony software, video monitors, cameras, or any other devices that support the communication of voice, video, text or other suitable forms of data using communication system 10. In the illustrated embodiment, communication devices 60a, 60b, 60d, and 60e represent Internet Protocol (IP) telephones and communication devices 60c and 60f represent telephony-enabled personal computers (PCs). Additionally, communication device 60i represents a mobile phone coupled to communication system 10 through PSTN 50. Although FIG. 1 illustrates a particular number and configuration of communication devices 60, communication system 10 contemplates any number and/or arrangement of such components.

Gateways 40 comprise any suitable combination of hardware and/or software for performing translation functions to facilitate seamless communication between PSTN 50 and LANs 80. These functions may include translation between transmission formats and between communication procedures. In addition, gateways 40 may also translate between audio and video CODECs and perform call setup and clearing on both the LAN side and the PSTN side. For example, gateway 40a may interface call manager 30a with PSTN 50. As a result, when a call is placed by any of communication devices 60g-i using PSTN 50, gateway 40a translates the call format associated with PSTN 50 to a call format associated with call manager 30a, such as, for example, SIP or another suitable packet-based communication protocol.

Call managers 30 comprise any suitable combination of hardware and/or software operable to establish a connection between two or more components, such as, for example, connecting a call between multiple communication devices 60 or between a particular communication device 60 and voicemail server 20. In a particular embodiment, call manager 30 comprises a Voice Over Internet Protocol (VoIP) server that performs the functions of signaling and session management within a packet telephony network. The signaling functionality of call manager 30 allows call information to be carried across network boundaries. The session management functionality of call manager 30 provides the ability to control the attributes of an end-to-end call across multiple networks in communication system 10. In a particular embodiment, the VoIP protocol supported by call manager 30 comprises Session Initiation Protocol (SIP), which is a standard for multimedia conferencing over internet protocol. In this embodiment, call managers 30 comprise SIP proxy servers that handle call processing, SIP requests, and SIP responses. Although the following description of call managers 30 is detailed with respect to SIP, it should be understood that call managers 30 may support other IP telephony protocols instead, such as the H.323 protocol. In particular embodiments, call managers 30 may also provide a number of telephony services for communication devices 60 and other devices located in LAN 80, including, but not limited to, call forwarding, teleconferencing, network monitoring, and CODEC translation.

Voicemail servers 20 support voicemail services for communication devices 60. More specifically, voicemail servers 20 may each generate voicemails, receive voicemails generated by other voicemail servers 20, store received or generated voicemails, and/or provide users access to stored voicemails. Voicemail servers 20 may include any appropriate combination of hardware and/or software suitable to provide the described voicemail functionality.

In particular embodiments, voicemail servers 20 each include a processor 22 operable to execute instructions associated with voicemail services and a memory 24 operable to store processor instructions and other appropriate information to be used by voicemail servers 20 during operation. Processor 22 may represent any suitable processing device capable of processing and communicating electronic information including, but not limited to, application-specific integrated circuits (ASICs), field-programmable gate arrays (FPGAs), digital signal processors (DSPs) and any other suitable specific or general-purpose processors. Memory 24 may represent any collection and arrangement of volatile or non-volatile, local or remote devices suitable for storing data including, but not limited to, random access memory (RAM) devices, read only memory (ROM) devices, magnetic storage devices, optical storage devices, or any other suitable data storage devices.

Additionally, particular embodiments of voicemail server 20 may include a voice announce module (VA) 26 and a text-to-speech (TTS) module 28 that perform specialized tasks, as described in greater detail below. VA module 26 and TTS module 28 may each represent any appropriate hardware and/or software to provide the described tasks. Although shown as separate, discrete components within voicemail server 20a, VA module 26 and TTS module 28 may represent or include, in part or in whole, shared components of voicemail server 20a. In particular embodiments, VA module 26 and TTS module 28 represent software modules running on processor 22.

LANs 80 and PSTN 50 provide connectivity between components coupled to them using any appropriate communication protocols. In particular embodiments, LANs 80 each represent all or a portion of an Ethernet network connecting the communication devices 60 of a particular entity, such as a company or a university campus. Furthermore, in particular embodiments, PSTN 50 represents all or a portion of the publicly-switched telephone network. Although FIG. 1 illustrates a particular embodiment of communication system 10 that includes particular types of networks, specifically LANs 80 and PSTN 50, coupling particular components of communication system 10, communication system 10 may include any appropriate types and numbers of networks.

In operation, a particular voicemail server 20 initiates a communication link 82 with call manager 30 to monitor call signaling messages and/or other types of messages that are transmitted to or from one or more of the communication devices 60 supported by call manager 30. In the example illustrated in FIG. 1, voicemail server 20a establishes a communication link 82 with call manager 30a to monitor call signaling messages sent to and from one or more communication devices 60, such as communication device 60b. Communication link 82 may represent any appropriate form of link allowing voicemail server 20a to monitor communication associated with particular communication devices 60 supported by call manager 30a, and voicemail server 20a may establish communication link 82 in any suitable manner. In particular embodiments, communication link 82 comprises a Computer Telephony Integration (CTI) link that voicemail server 20a establishes using a Java Telephony Application Programming Interface (JTAPI) interface 84.

After establishing communication link 82 with call manager 30a, voicemail server 20a may begin monitoring messages received by call manager 30a that are to and/or from communication device 60b. In particular, voicemail server 20a may register with call manager 30a to be notified of incoming calls to communication device 60b. For example, in an embodiment of communication system 10 which supports SIP, voicemail server 20a may register to be notified of all SIP invitations sent to communication device 60b. As part of this notification, voicemail server 20a may receive any appropriate information associated with each incoming call. In particular embodiments, call manager 30a may communicate caller identification information 90 associated with the call. Caller identification information 90 may include any appropriate information that identifies the caller making the incoming call and/or the communication device 60 the caller is using including, but not limited to, the caller's name, an Internet Protocol (IP) address associated with the relevant communication device 60, a phone number for the communication device 60, and/or an extension number for the communication device 60.

Additionally, voicemail server 20a may also disable a default ringer of communication device 60b and/or other call indicators that communication device 60b may use to indicate to a user that communication device 60b is receiving a call. Voicemail server 20a may disable the default ringer and/or other call indicators in any appropriate manner based on the configuration and characteristics of voicemail server 20a and communication device 60b. In a particular embodiment, voicemail server 20a disables the default ringer of communication device 60b by transmitting a HyperText Transfer Protocol ("HTTP") message to communication device 60b that instructs communication device 60b not to use the default ringer to indicate any subsequent incoming calls. Furthermore, voicemail server 20a may configure communication device 60b to receive notifications from voicemail server 20a of incoming calls intended for communication device 60b. Voicemail server 20a may configure communication device 60b in any appropriate manner based on the characteristics of communication device 60b. For example, in particular embodiments, voicemail server 20a may transmit an HTTP request to communication device 60b that instructs communication device 60b to accept notifications from voicemail server 20a on a particular port of communication device 60b.

After registration with call manager 30a and any appropriate configuration of communication device 60b, voicemail server 20a begins monitoring communication between communication device 60b and other communication devices 60. As a result of the voicemail server's registration with call manager 30a, call manager 30a notifies voicemail server 20a of incoming calls to communication device 60b by transmitting caller identification information 90 to voicemail server 20a. Thus, when another user (referred to here as "the calling party") places a call to the user associated with communication device 60b (referred to here as the "called party") voicemail server 20a receives caller identification information 90 from call manager 30a. Voicemail server 20a may then attempt to match all or a portion of the received caller identification information 90 with any of a plurality of identifier messages 116 stored on or accessible by voicemail server 20a. For example, in particular embodiments, voicemail server 20a stores a table 100 that includes a user record 110 for one or more users having voicemail accounts that are hosted by voicemail server 20a. Each user record 110 may, in particular embodiments, include a user identifier 112, such as a name, social security number, or other suitable identifier for a particular user, and/or a device identifier 114, such as a phone number, extension, IP address or other suitable identifier, for a communication device 60 associated with that user. Each user record 110 may also include a stored identifier message 116 for the relevant user. Voicemail server 20a may match all or a portion of caller identification information 90 to a particular user record 110 in the table 100, and access the stored identifier message 116 included in the matched user record 110. This matching process is described in greater detail below with respect to FIGS. 2A and 2B.

Stored identifier messages 116 may represent any suitable audio messages that identify the associated user in any appropriate manner and may be stored in any suitable format. In particular embodiments, each stored identifier message 116 comprises a digital recording, such as a WAV file, of the user stating his or her name. Furthermore, in particular embodiments of communication system 10, each user records his or her name as part of the process for initializing their voicemail account. Voicemail server 20a then uses these recordings as part of the greeting that is played to callers when they are forwarded to a particular user's voicemail account. In such embodiments of communication system 10, voicemail server 20 may also use these recordings as stored identifier messages 116 for the user who recorded the message, saving time and effort in the initialization process.

When voicemail server 20a subsequently receives caller identification information 90 from call manager 30a, voicemail server 20a determines whether caller identification information 90 matches one of the stored identifier messages 116. If voicemail server 20a determines that caller identification information 90 matches one of the stored identifier messages 116, voicemail server 20a transmits the matched identifier message 116 to communication device 60b along with any appropriate additional information. Voicemail server 20a may also transmit additional audio information to communication device 60b, such as an introductory phrase and/or tone, to be generated by communication device 60b in addition to the identifier message 116. For example, when voicemail server 20a detects an incoming call from a "John Doe", voicemail server 20a may transmit audio data that includes a beep and the phrase "Call from . . . " along with John Doe's identifier message 116, so that communication device 60b, using its speaker, generates a beep followed by the message "Call from John Doe." Voicemail server 20a may transmit identifier message 116 to communication device 60b in any appropriate manner based on the configuration and capabilities of voicemail server 20a and communication device 60b. In particular embodiments, voicemail server 20a transmits identifier message 116 to a predetermined port of communication device 60b as a Real-Time Transport Protocol (RTP) stream 130.

When communication device 60b receives stored identifier message 116, communication device 60b may play stored identifier message 116 using a speaker or other suitable interface of communication device 60b to indicate that communication device 60b has received an incoming call. As a result, the stored identifier message 116 may serve as an indication to the called party that communication device 60b is receiving an incoming call. Moreover, because the stored identifier message 116 provides an audio identification of the calling party, the called party may be able determine whether to answer the incoming call and/or take any other appropriate actions, such as forwarding the call to voicemail, without approaching or turning to face communication device 60b. In this regard, the use of an identifier 116 may replace a traditional ringing of a telephone.

If voicemail server 20a is unable to match caller identification information 90 with any stored identifier messages 116, voicemail server 20a may instead use TTS module 28 to generate audio data representing artificial speech signals from all or a portion of caller identification information 90 for transmission to communication device 60b. As one example, this may occur in particular embodiments for incoming calls received from communication devices 60 external to LAN 80, such as communication devices 60g-60i. Under such circumstances, TTS module 28 may generate audio data from any appropriate portion of caller identification information 90.

For example, in particular embodiments, TTS module 28 of voicemail server 20a first determines whether a name is included in caller identification information 90. If so, TTS module 28 generates speech data based on the name included in caller identification information 90. If no name is included in caller identification information 90, TTS module 28 generates audio data based on a telephone number included in caller identification information 90. Moreover, if no name or telephone number are included in caller identification information 90, TTS module 28 generates audio data based on any other appropriate portion of caller identification information 90. After TTS module 28 generates audio data, voicemail server 20 transmits this audio data to communication device 60b in any appropriate manner based on the configuration and capabilities of voicemail server 20 and communication device 60b. In particular embodiments, voicemail server 20 transmits the audio data to a predetermined port of communication device 60b as a Real-Time Transport Protocol (RTP) stream 130 in a similar manner to that described above with respect to the stored identifier message 116. When communication device 60b receives the audio data generated by TTS module 28, communication device 60b may play this audio data using a speaker or other suitable interface of communication device 60b to indicate that communication device 60b has received an incoming call.

Although the description above focuses on an example in which the caller and the called party both utilize communication devices 60 coupled to the same LAN 80, particular embodiments of communication system 10 may be configured to provide the same functionality for calls between communication devices 60 coupled to different LANs 80 or between a communication device 60 couple to a particular LAN 80 and a communication device 60 coupled to PSTN 50. For example, in particular embodiments of communication system 10, voicemail server 20a may be configured to attempt to match caller identification information 90 associated with incoming calls from communication devices 60 that are external to LAN 80a in the same manner as voicemail server 20a does for calls from communication devices 60 coupled to LAN 80a. As one example, if LAN 80 connects all of a company's communication devices 60, voicemail server 20a, in addition to storing office phone numbers for appropriate users, may maintain home phone numbers, mobile phone numbers, or other external phone numbers for one or more users having voicemail accounts hosted by voicemail server 20a. When communication device 60b receives an incoming call from, for example, communication device 60g, voicemail server 20a may be able to match a telephone number included in the received caller identification information 90 to a stored identifier message 116 associated with a particular user and may transmit the matched stored identifier message 116 to communication device 60b, as described above. Additionally, voicemail server 20 may transmit additional audio information to communication device 60b indicating that the call is coming from an external number. For example, voicemail server 20 may precede stored identifier message 116 by audio data that will generate the phrase "External call from . . ." when played by communication device 60b.

Additionally, although the above description illustrates an example in which a particular voicemail server 20 monitors incoming calls to a single communication device 60, voicemail servers 20 may be configured to monitor and process incoming calls to any appropriate number of communication devices 60 at one time. For example, a particular voicemail server 20 may be configured to monitor incoming calls for all communication devices 60 coupled to the LAN 80 in which voicemail server 20 is located. Additionally, the communication devices 60 that a particular voicemail server 20 monitors may be predetermined and fixed or may be determined dynamically during operation as appropriate based on the configuration and characteristics of communication system 10.

Thus, communication system 10 supports the use of a call indicator that provides useful information about the calling party. Moreover, particular embodiments of voicemail server 20 may provide robust functionality capable of generating the call indicator based on whatever information is available in caller identification information 90. Additionally, because this call indicator can be generated based on audio data already recorded for use with voicemail services supported by communication system 10, communication system 10 may limit the amount of time and effort needed to configure voicemail server 20 to provide this call indicator. Furthermore, in particular embodiments of communication system 10, the call indicator is played using existing hardware of communication device 60, eliminating the need to add to or modify the hardware in communication system 10. In this regard, communication system 10 provides several benefits. Various embodiments of communication system 10 may exhibit some, none, or all of these benefits.

Figure 2A:
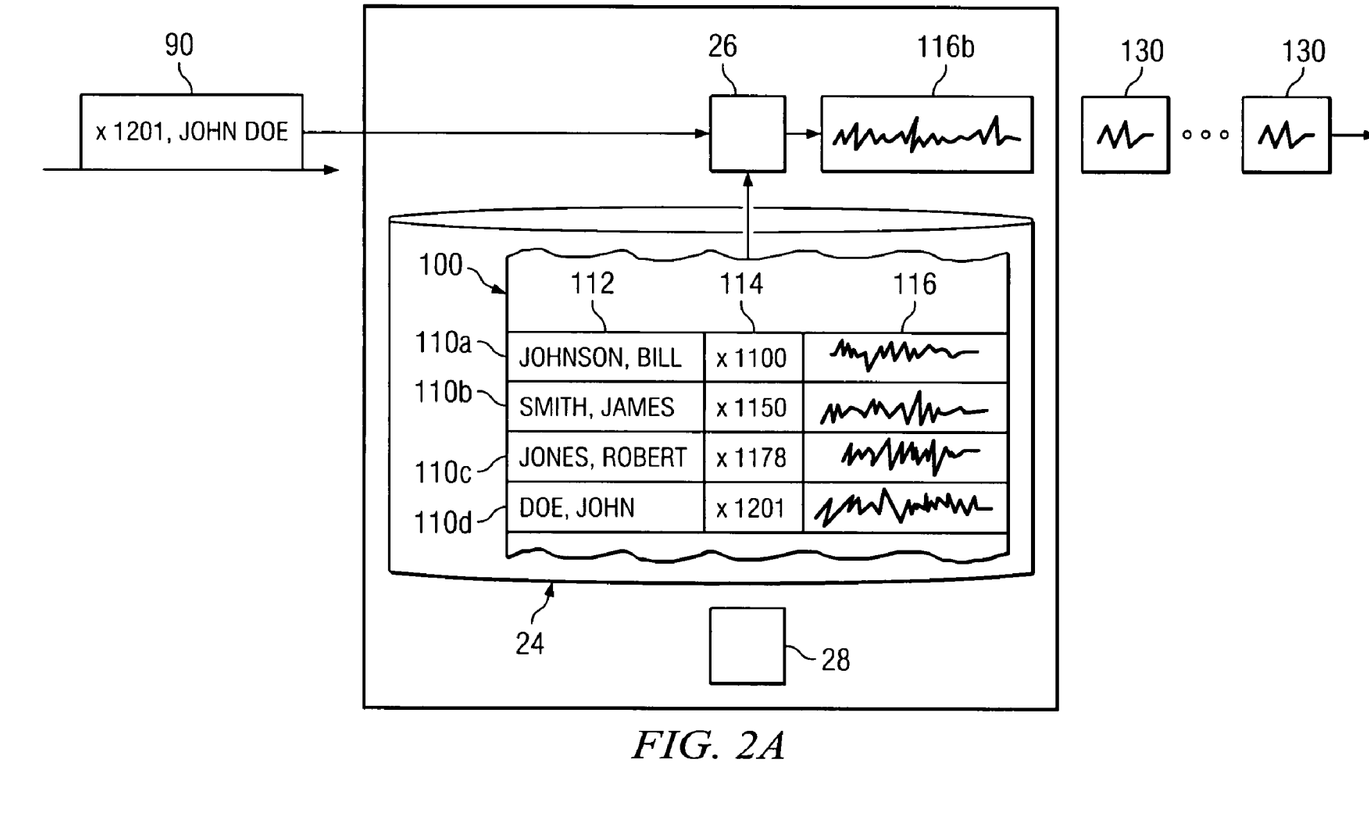
FIGS. 2A-2B illustrate example operation of a particular embodiment of a voicemail server that may be used in the communication system of FIG. 1.
Figure 2B:
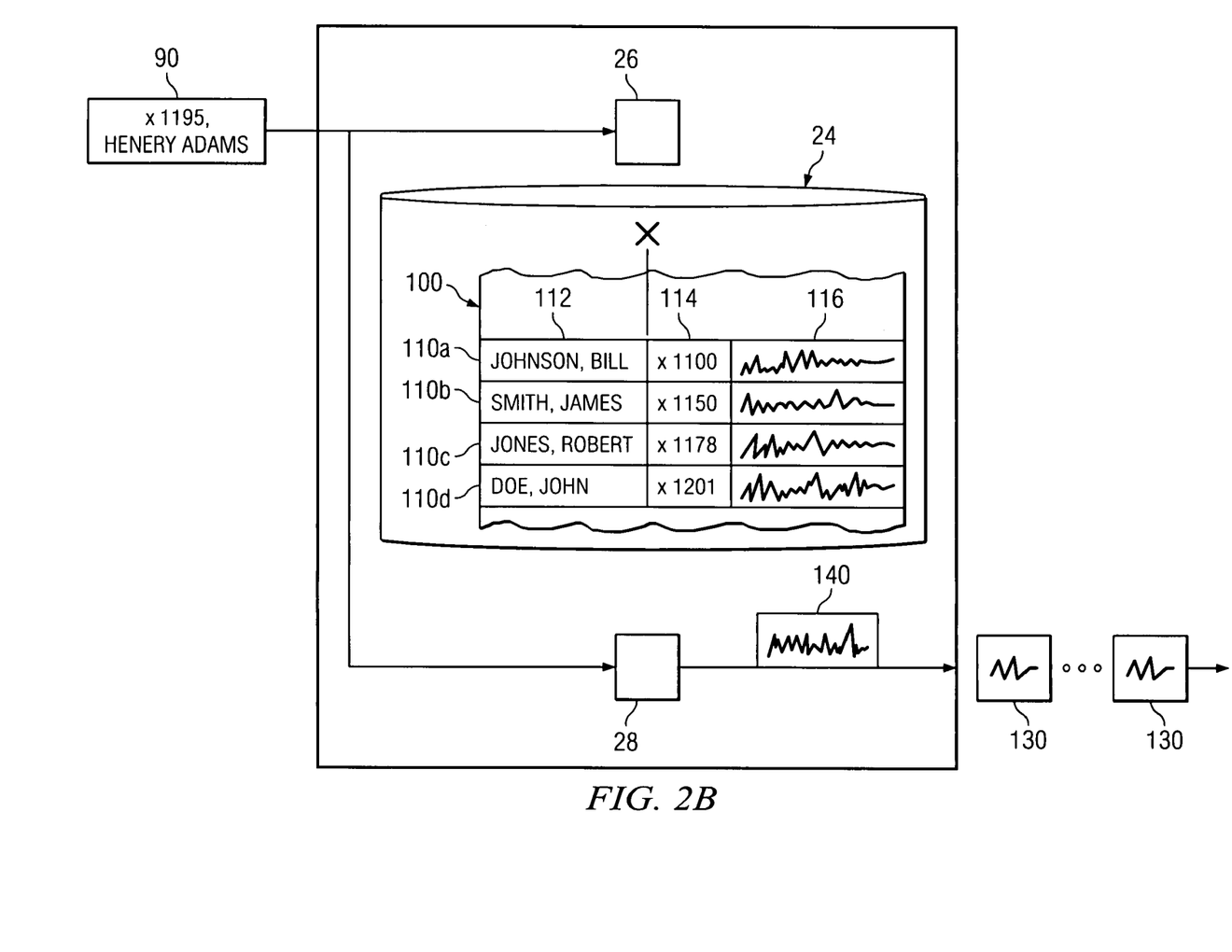

FIGS. 2A and 2B illustrate operation of a particular embodiment of a voicemail server 20 in matching caller identification information 90 to a particular identifier message 116 when a call is placed to communication device 60b. In particular, FIGS. 2A and 2B illustrate a portion of a table 100 stored in memory 24 of a particular voicemail server 20 that includes a plurality of user records 110. Each user record 110 includes a user identifier 112, a device identifier 114, and a stored identifier message 116. Upon receiving caller identification information 90 from call manager 30, VA module 26 attempts to match all or a portion of caller identification information 90 to a user identifier 112, a device identifier 114, and/or any other appropriate element of a user record 110. For example, in the illustrated embodiment, caller identification information 90 includes a phone extension for a communication device 60 calling communication device 60b and additional information. In the illustrated embodiment, VA module 26 extracts the extension from caller identification information 90 and attempts to match this extension to device identifiers 114 in user records 110.

If caller identification information 90 matches the device identifier 114 in one of user records 110, as is the case in the example illustrated by FIG. 2A, voicemail server 20 accesses the stored identifier message 116 in the matched user record 110. Voicemail server 20 may then transmit the relevant stored identifier message 116 to communication device 60b in an appropriate manner based on the configuration and capabilities of voicemail server 20 and communication device 60b.

In the example shown in FIG. 2A, voicemail server 20 matches a phone number in caller identification information 90 to the device identifier 114 in user record 110d. As a result, voicemail server 20 accesses the stored identifier message 116 stored in user record 110d. Voicemail server 20 then transmits stored identifier message 116d to communication device 60b. In the illustrated example, voicemail server 20 packetizes audio data in stored identifier message 116 and transmits the packetized audio data to communication device 60b as part of an RTP stream 130.

If, instead, caller identification information 90 does not match the device identifier 114 in any of the user records 110 stored in table 100, as is the case in the example illustrated by FIG. 2B, voicemail server 20 generates audio data 140 based on caller identification information 90 using TTS module 28. As noted above with respect to FIG. 1, TTS module 28 may generate audio data 140 based on any appropriate portion of caller identification information 90. Voicemail server 20 may then transmit the audio data 140 to communication device 60b in an appropriate manner based on the configuration and capabilities of voicemail server 20 and communication device 60b.

In the example shown in FIG. 2B, the phone number received as part of caller identification information 90 does not match the device identifier 114 in any of user records 110. As a result, TTS module 28 generates audio data 140 based on an appropriate portion of caller identification information 90. In the illustrated example, TTS module 28 generates speech data based on a caller name included in caller identification information 90. Thus, audio data 140 represents data describing speech signals generated by TTS module 28 from the text "Henry Adams." Voicemail server 20 then transmits audio data 140 to communication device 60b. In the illustrated example, voicemail server 20 packetizes audio data 140 and transmits the packetized audio data 140 to communication device 60b as part of an RTP stream 130.

Figure 3:
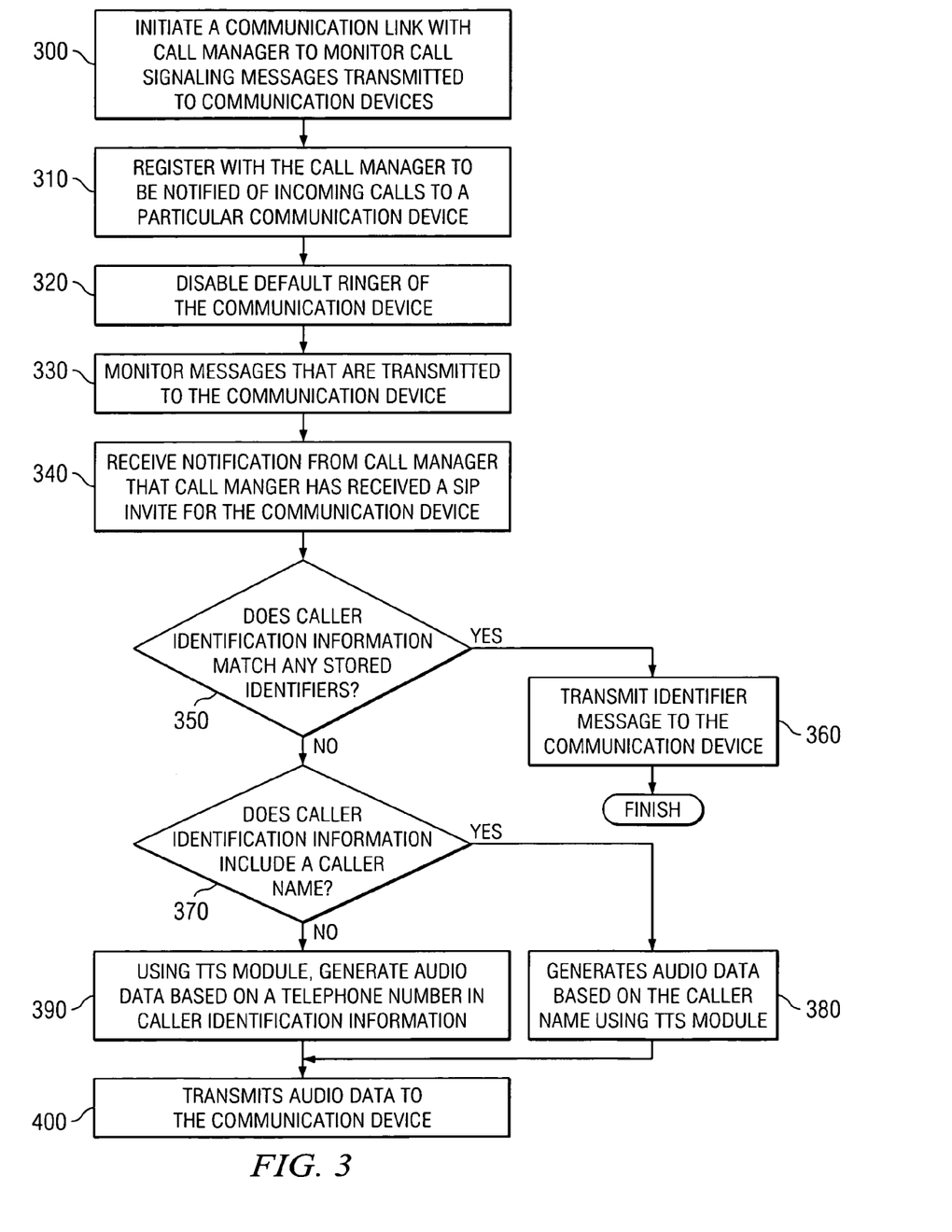
FIG. 3 is a flowchart illustrating further example operation of the voicemail server.

FIG. 3 is a flowchart illustrating an example operation of voicemail server 20 according to a particular embodiment. In particular, FIG. 3 illustrates operation of voicemail server 20 in selecting a stored identifier message 116 for calls to a particular communication device 60 (referred to here as the "called communication device 60") and transmitting the selected stored identifier message 116 to the called communication device 60. Although FIG. 3 illustrates operation of an embodiment of voicemail server 20 that performs particular steps in a particular order, alternative embodiments may omit any of these steps or include any appropriate additional steps and may perform the illustrated steps in any appropriate order.

The described operation begins at step 300 where voicemail server 20 initiates a communication link 82 with call manager 30 to monitor call signaling messages and/or other types of messages that are transmitted to or from one or more of the communication devices 60 supported by call manager 30. In particular embodiments, communication link 82 comprises a Computer Telephony Integration (CTI) link that voicemail server 20 establishes using a Java Telephony Application Programming Interface (JTAPI) interface 84. After establishing communication link 82, voicemail server 20, at step 310, registers with call manager 30 to be notified of incoming calls to the called communication device 60. For example, voicemail server 20 may register to be notified of all SIP invitations sent to the called communication device 60.

Voicemail server 20 disables a default ringer of the called communication device 60 at step 320. In particular embodiments, voicemail server 20 may disable the default ringer by transmitting an HTTP message to the called communication device 60 that instructs the called communication device 60 to deactivate the default ringer and that specifies a port of the called communication device 60 on which voicemail server 20 will transmit call indicator information to the called communication device 60. After any appropriate configuration of the called communication device 60, voicemail server 20 monitors messages received by call manager 30 that are transmitted to and from the called communication device 60, at step 330.

At step 340, voicemail server 20 receives notification from call manager 30 that call manger 30 has received a SIP invite for the called communication device 20. The notification may include caller identification information 90. Moreover, caller identification information 90 may include a name of the caller, a phone number for the caller, and/or any other appropriate information about the caller. Voicemail server 20 determines whether the caller identification information 90 matches any of a plurality of stored identifiers maintained by voicemail server 20 at step 350. In doing so, voicemail server 20 may attempt to match caller identification information 90 to a user identifier 112, a device identifier 114, and/or any other appropriate identifier included in a particular user record 110, based on the configuration of voicemail server 20 and the contents of caller identification information 90.

If voicemail server 20 determines that caller identification information 90 matches one of the stored identifiers, voicemail server 20 transmits a stored identifier message 116 associated with the matched stored identifier to the called communication device 60 at step 360. In particular embodiments, voicemail server 20 transmits the associated stored identifier message 116 to a predetermined port of the called communication device 60 as Real-Time Transport Protocol (RTP) stream 130. Voicemail server 20 may also transmit additional audio information to the called communication device 60, such as an introductory phrase and/or tone, to be generated by the called communication device 60 in addition to the stored identifier message 116. When the called communication device 60 receives the selected stored identifier message 116, the called communication device 60 may play this audio data using a speaker or other suitable interface of the called communication device 60 to indicate that the called communication device 60 has received an incoming call.

If voicemail server 20 is unable to match caller identification information 90 with any stored identifier messages 116, as determined at step 350, execution proceeds to step 370 where voicemail server 20 determines whether caller identification information 90 includes a caller name. If so, voicemail server 20 generates, using TTS module 28, audio data 140 based on the caller name at step 380. If voicemail server 20 determines no caller name is included in caller identification information 90, voicemail server 20 generates, using TTS module 28, audio data 140 based on a telephone number included in caller identification information 90 at step 390. After generating audio data 140, voicemail server 20 transmits this audio data 140 to the called communication device 60 at step 400. In particular embodiments, voicemail server 20 transmits the audio data 140 to a predetermined port of the called communication device 60 as RTP stream 130. When the called communication device 60 receives audio data 140 generated by TTS module 28, the called communication device 60 may play this audio data 140 using a speaker or other suitable interface of the called communication device 60 to indicate that the called communication device 60 has received an incoming call.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method of providing communication service comprising:
   receiving caller identification information associated with a call to a communication device;
   determining whether the caller identification information corresponds to any of a plurality of stored identifiers, each stored identifier associated with pre-recorded audio data;
   in response to determining that the caller identification information corresponds to a stored identifier, transmitting the pre-recorded audio data associated with the corresponding stored identifier to the communication device, wherein the pre-recorded audio data comprises at least a portion of a greeting utilized by a voicemail account of a caller associated with the call; and
   in response to determining that the caller identification information does not correspond to any of the stored identifiers:
   determining whether the caller identification information includes a caller name;
   in response to determining that the caller identification information includes a caller name, generating audio data based, at least in part, on the caller name;
   in response to determining that the caller identification information does not include a caller name, generating audio data based, at least in part, on a caller phone number included in the caller identification information; and
   transmitting the generated audio data to the communication device.

2. The method of claim 1, wherein the caller identification information comprises a device identifier that identifies a communication device associated with the caller, and wherein determining whether the caller identification information corresponds to any of the stored identifiers comprises determining whether the device identifier corresponds to any of a plurality of stored device identifiers.

3. The method of claim 1, further comprising playing the audio data at the communication device.

4. The method of claim 1, wherein the audio data identifies a caller associated with the call when played.

5. The method of claim 1, further comprising disabling a default ringer of the communication device in conjunction with receiving the caller identification information.

6. The method of claim 1, wherein transmitting the audio data to the communication device comprises:
generating a plurality of packets, each packet comprising a portion of the audio data; and
transmitting the plurality of packets to the communication device as part of a stream of audio data.

7. A system for providing communication service comprising:
a plurality of communication devices operable to provide communication services to a plurality of users; and
a server operable to:
receive caller identification information associated with a call from a first communication device to a second communication device;
determine whether the caller identification information corresponds to any of a plurality of stored identifiers, each stored identifier associated with pre-recorded audio data;
in response to determining that the caller identification information corresponds to a stored identifier, transmit the pre-recorded audio data associated with the corresponding stored identifier to the second communication device, wherein the pre-recorded audio data comprises at least a portion of a greeting utilized by a voicemail account of a caller associated with the call; and
in response to determining that the caller identification information does not correspond to any of the stored identifiers:
determining whether the caller identification information includes a caller name;
in response to determining that the caller identification information includes a caller name, generating audio data based, at least in part, on the caller name;
in response to determining that the caller identification information does not include a caller name, generating audio data based, at least in part, on a caller phone number included in the caller identification information; and
transmit the generated audio data to the second communication device.

8. The system of claim 7, wherein the second communication device is further operable to play the audio data transmitted by the server.

9. The system of claim 7, wherein the caller identification information comprises a device identifier that identifies a communication device associated with the caller, and wherein the server is operable to determine whether the caller identification information corresponds to any of the stored identifiers by determining whether the device identifier corresponds to any of a plurality of stored device identifiers.

10. The system of claim 7, wherein the second communication device is further operable to play the audio data transmitted by the server, and wherein the audio data identifies a caller associated with the call when the second communication device plays the audio data.

11. The system of claim 7, wherein the server is further operable to disable a default ringer of the communication device in conjunction with receiving the caller identification information.

12. The system of claim 7, wherein the server comprises a voicemail server.

13. The system of claim 7, wherein the server is operable to transmit the audio data to the communication device by:
generating a plurality of packets, each packet comprising a portion of the audio data; and
transmitting the plurality of packets to the second communication device as part of a stream of audio data.

14. An apparatus for providing communication service comprising:
a memory operable to store a plurality of stored identifiers, each stored identifier associated with pre-recorded audio data; and
a processor operable to:
receive caller identification information associated with a call from a first communication device to a second communication device;
determine whether the caller identification information corresponds to any of the stored identifiers;
in response to determining that the caller identification information corresponds to a stored identifier, transmit the pre-recorded audio data associated with the corresponding stored identifier to the second communication device, wherein the pre-recorded audio data comprises at least a portion of a greeting utilized by a voicemail account of a caller associated with the call; and
in response to determining that the caller identification information does not correspond to any of the stored identifiers:
determine whether the caller identification information includes a caller name;
in response to determining that the caller identification information includes a caller name, generate audio data based, at least in part, on the caller name;
in response to determining that the caller identification information does not include a caller name, generate audio data based, at least in part, on a caller phone number included in the caller identification information; and
transmit the generated audio data to the second communication device.

15. The apparatus of claim 14, wherein the caller identification information comprises a device identifier that identifies a communication device associated with the caller, and wherein the processor is operable to determine whether the caller identification information corresponds to any of the stored identifiers by determining whether the device identifier corresponds to any of a plurality of stored device identifiers.

16. The apparatus of claim 14, wherein the audio data identifies a caller associated with the call when the second communication device plays the audio data.

17. The apparatus of claim 14, wherein the processor is further operable to disable a default ringer of the communication device in conjunction with receiving the caller identification information.

18. The apparatus of claim 14, wherein the processor is operable to transmit the audio data to the communication device by:
generating a plurality of packets, each packet comprising a portion of the audio data; and
transmitting the plurality of packets to the second communication device as part of a stream of audio data.

19. An apparatus for providing communication service comprising:
means for receiving caller identification information associated with a call to a communication device;
means for determining whether the caller identification information corresponds to any of a plurality of stored identifiers, each stored identifier associated with pre-recorded audio data;

means for transmitting the pre-recorded audio data associated with the corresponding stored identifier to the communication device, wherein the pre-recorded audio data comprises at least a portion of a greeting utilized by a voicemail account of a caller associated with the call, in response to determining that the caller identification information corresponds to a stored identifier;

means for determining whether the caller identification information includes a caller name in response to determining that the caller identification information does not correspond to any of the stored identifiers;

means for generating, in response to determining that the caller information includes a caller name, audio data based, at least in part, on the caller name;

means for generating, in response to determining that the caller information does not include a caller name, audio data based, at least in part, on a caller phone number included in the caller identification information; and means for transmitting the generated audio data to the communication device.

* * * * *